Sept. 9, 1941.  J. VAN VORST  2,255,718
TIRE GROOVING MEANS
Filed Aug. 26, 1939
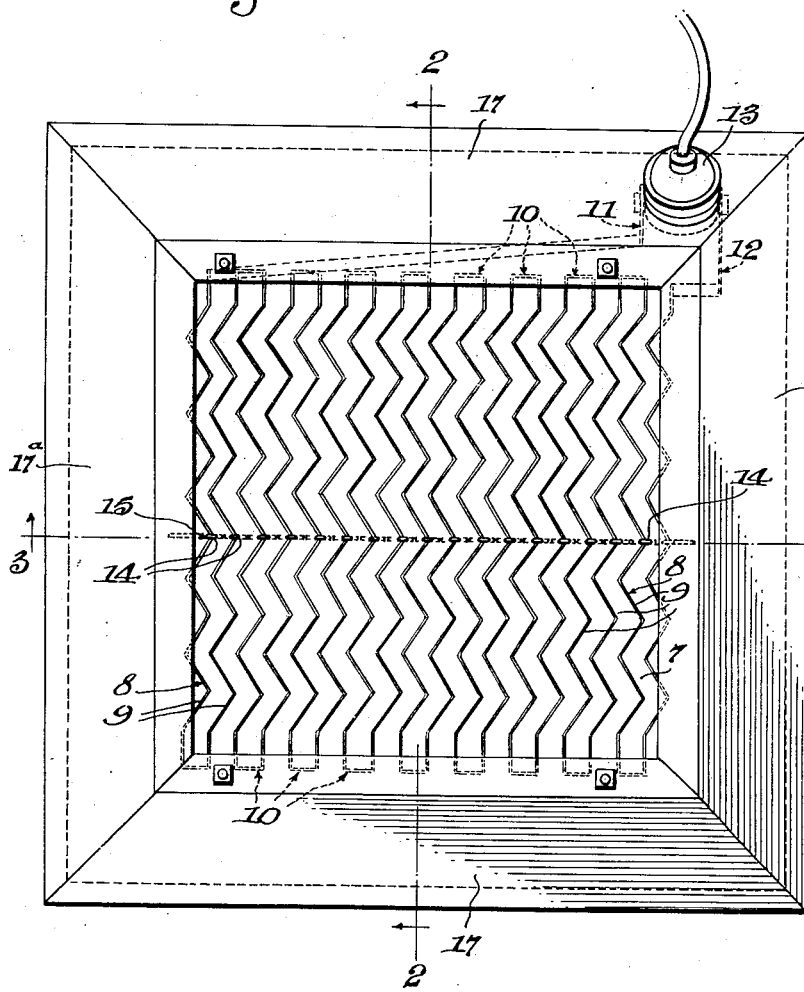
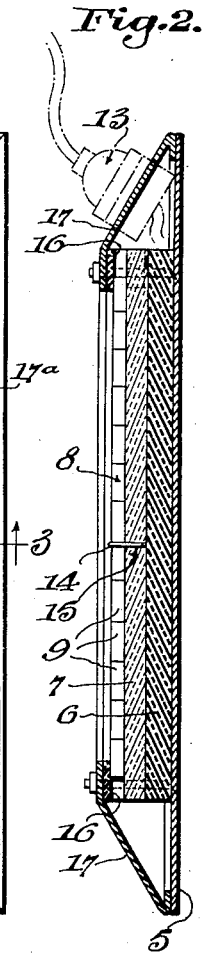
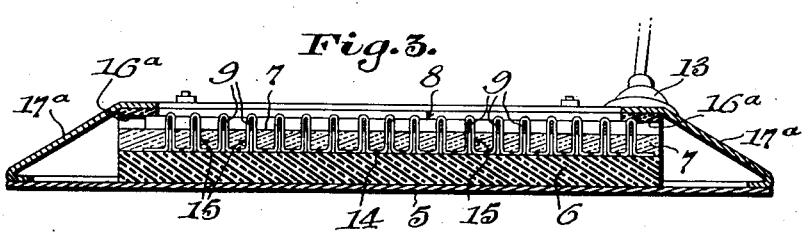
Inventor
John Van Vorst Patented Sept. 9, 1941

2,255,718

UNITED STATES PATENT OFFICE 2,255,718

TIRE GROOVING MEANS

John Van Vorst, Frankfort, N. Y.

Application August 26, 1939, Serial No. 292,143

2 Claims. (Cl. 219—29)

The invention aims to make novel provision for rapidly, easily and effectively grooving the treads of new or old rubber tires by utilizing a series of burning irons, preferably sharpened, to form the grooves, said burning irons being electrical resistance elements heated by the passage of electrical current longitudinally therethrough.

With the foregoing in view, the invention resides in the novel subject matter hereinafter described and claimed, description being accomplished by reference to the accompanying drawing.

Figure 1 is a top plan view showing a tire grooving device constructed in accordance with the invention.

Figures 2 and 3 are vertical sectional views on lines 2—2 and 3—3 of Fig. 1.

The device which I have illustrated in Figures 1 to 3 is substantially square in top plan and may be used for grooving tires either circumferentially or transversely of their treads, but it is to be understood that said device could be elongated in one direction to groove the treads only circumferentially, or could be elongated in a direction at right angles to groove the treads only transversely. Furthermore, while the device is shown as consisting only of a single unit, embodying a single heating unit, it is to be understood that it could be constructed from a plurality of units or sections, if desired.

A substantially square base plate 5 of suitable gauge metal is provided. Upon this base plate rests a somewhat smaller insulating body 6, 7 composed from any desired electrical insulating material which will resist the heat to which it is subjected. In the present showing, the insulating body is composed of two contacting slabs, at least the uppermost slab 7 being preferably formed from asbestos board or the like.

Resting upon the slab 7 is an electrical heating unit 8 in the form of a zig-zag coil, the various reaches or resistance elements 9 of which are of zig-zag or equivalent configuration, said reaches or resistance elements being unidirectionally disposed in closely spaced relation and being connected at their ends, as shown at 10. The terminals 11 and 12 of the endmost reaches or resistance elements are connected with an appropriate separable plug or the like 13 to which current may be supplied from any desired outlet. Preferably, the heating element 8 is composed of flat Nichrome wire standing on edge with the top edge sharpened although any other appropriate resistance material could of course be used. The zig-zag form of the reaches or resistance elements 9 minimizes danger of lateral tilting and it is preferable that said reaches or resistance elements 9 be fastened to the slab 7 by means of wire clips 14 passing over said reaches and through openings 15 in said slab, the lower ends of said clips being clinched against the lower side of the slab as seen in Fig. 3.

Two insulating strips 16 are disposed upon the connected ends 10 of the reaches 9, and two inclined approach plates 17 extend from two edges of the base plate 5 and at their inner portions lie upon said insulating strips 16, bolts 18 being passed through the plate 5, the slabs 6 and 7, the strips 16 and the inner edge portions of the plates 17 to hold all of these parts in assembled relation.

I have shown two additional inclined approach plates 17a extending inwardly from the other two edges of the base plate 5 and held a safe distance above the endmost of the reaches 9, by insulating strips 16a.

With the construction shown, the burning irons 9 may be highly heated and the rubber tired wheels of a vehicle may be run over them in a direction to longitudinally groove the tire treads or to transversely groove the same. The burning irons effectively and quickly burn their way into the rubber and the extent to which they penetrate is determined by the distance which they project above the slab 7.

The invention is simple and may be practiced inexpensively to groove either new or old tires, and obviously the burning irons may be arranged in any of a great variety of ways to produce desired arrangements of grooves for anti-skidding and traction purposes.

I claim:

1. In a tire grooving device, a flat body formed of upper and lower insulating slabs lying one upon the other, electrical resistance elements of flat cross section standing on edge on said upper slab, U-shaped clips straddling said resistance elements and passing through said upper slab, the lower ends of said clips being clinched against the lower side of said upper slab, means for holding said slabs in assembled relation, and current-conducting means for said resistance elements connected to cause flow of current longitudinally therethrough.

2. A tire grooving device comprising a flat rectangular metal base plate, a flat rectangular insulating body lying on said base plate, said insulating body having two of its opposite edges spaced inwardly from the two corresponding edges of said base plate, an electrical heating element lying upon said insulating body and composed of various unidirectional reaches connected at their ends near said two opposite edges of said insulating body, insulating strips lying upon the connected ends of said reaches, inclined approach plates extending inwardly from said two edges of said base plate and having their inner edge portions lying upon said insulating strips, and fasteners extending through said base plate, said insulating body, said insulating strips and said approach plates.

JOHN VAN VORST.